(12) United States Patent
Miyakawa et al.

(10) Patent No.: US 11,995,861 B2
(45) Date of Patent: May 28, 2024

(54) INFORMATION PROCESSING SYSTEM, CONTENT GENERATION DEVICE, CONTENT PRESENTATION DEVICE, CONTENT GENERATION METHOD, CONTENT PRESENTATION METHOD, AND PROGRAM

(71) Applicant: NIPPON TELEGRAPH AND TELEPHONE CORPORATION, Tokyo (JP)

(72) Inventors: Kazu Miyakawa, Musashino (JP); Shingo Kinoshita, Musashino (JP); Kenya Suzuki, Musashino (JP); Satoshi Sakuma, Musashino (JP); Tatsuya Matsui, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 296 days.

(21) Appl. No.: 17/594,028

(22) PCT Filed: Mar. 19, 2020

(86) PCT No.: PCT/JP2020/012447
§ 371 (c)(1),
(2) Date: Sep. 30, 2021

(87) PCT Pub. No.: WO2020/203368
PCT Pub. Date: Oct. 8, 2020

(65) Prior Publication Data
US 2022/0148215 A1 May 12, 2022

(30) Foreign Application Priority Data
Apr. 1, 2019 (JP) ................................ 2019-070141

(51) Int. Cl.
*G06T 7/70* (2017.01)
*G06V 10/40* (2022.01)

(52) U.S. Cl.
CPC ................ *G06T 7/70* (2017.01); *G06V 10/40* (2022.01); *G06T 2207/10016* (2013.01)

(58) Field of Classification Search
CPC ........... G06T 19/00; G06T 2207/10016; G06T 2207/30196; G06T 2207/30242;
(Continued)

(56) References Cited

U.S. PATENT DOCUMENTS

| 2014/0218361 | A1 | 8/2014 | Abe et al. | |
| 2015/0222861 | A1* | 8/2015 | Fujii | ....................... G06T 11/00 348/143 |

(Continued)

FOREIGN PATENT DOCUMENTS

| CN | 105188516 | * 12/2017 |
| JP | 2000357286 | * 12/2000 |

(Continued)

OTHER PUBLICATIONS

Datachemeng.com, Retrieved on Mar. 20, 2019, from URL: https://datachemeng.com/gaussianmixturemodel/.

(Continued)

*Primary Examiner* — Ruiping Li
(74) *Attorney, Agent, or Firm* — XSENSUS LLP

(57) ABSTRACT

More expressive content for a pseudo experience is presented. An information processing system (1) according to the present invention includes a management server (10) and a client terminal (20), the management server (10) includes a video image input unit (11) that acquires an input video image, a video image detection unit (12) that detects position information of an object from the acquired input video image, an attribute extraction unit (13) that extracts attribute (Continued)

information of the object from the acquired input video image, and an information generation unit (14) that generates content information corresponding to the position information and the attribute information, and the client terminal (20) includes a presentation control unit (24) that controls presentation of the content by a content presentation unit (3) that presents the content according to the generated content information.

6 Claims, 6 Drawing Sheets

(58) Field of Classification Search
CPC .. G06T 7/70; G06T 7/74; G06V 10/40; G06V 20/53; G06V 20/54; H04N 21/234; H04N 21/2343; H04N 21/235; H04N 21/431; H04N 21/435; H04N 21/854
See application file for complete search history.

(56) References Cited

U.S. PATENT DOCUMENTS

2018/0137651 A1* 5/2018 Levinshtein .............. G06T 9/20
2018/0234612 A1* 8/2018 Kunkel .................. H04N 23/66

FOREIGN PATENT DOCUMENTS

| JP | 2014149712 A | 8/2014 |
|----|--------------|--------|
| JP | 2015149558 A | 8/2015 |

OTHER PUBLICATIONS

Jun. 16, 2020, International Search Report issued in the International Patent Application No. PCT/JP2020/012447.
Nextgeneventco.com, Retrieved on Mar. 20, 2019, from URL: http://nextgeneventco.com/vr-surfing-simulator-ny-nj-ct-ba/.

* cited by examiner

FIG. 3

| AREA (A) | COORDINATE (x) | COORDINATE (y) | COORDINATE (z) | SIZE (w) | SIZE (h) |
|---|---|---|---|---|---|
| α | 32 | 8 | 120 | 11 | 21 |
| β | 56 | 8 | 116 | 12 | 18 |
| γ | 70 | 6 | 119 | 9 | 13 |
| δ | 85 | 7 | 109 | 10 | 20 |
| ε | 53 | 23 | 82 | 14 | 28 |
| ... | | | | | |

FIG. 4

| AREA (A) | GENDER (G) | AGE GROUP (Y) | HEIGHT (T) | CLOTHES (C) | MOTION VECTOR (V) |
|---|---|---|---|---|---|
| α | M | 20 to 30 | 160 | DARK BLUE | (10, −1) |
| β | M | 30 to 40 | 180 | BLUE | (−8, 3) |
| γ | F | 30 to 40 | 160 | BROWN | (−7, 2) |
| δ | M | 10 to 20 | 155 | BLUE | (21, −6) |
| ε | F | 20 to 30 | 155 | WHITE | (−2, 0) |
| ... | | | | | |

INFORMATION PROCESSING SYSTEM, CONTENT GENERATION DEVICE, CONTENT PRESENTATION DEVICE, CONTENT GENERATION METHOD, CONTENT PRESENTATION METHOD, AND PROGRAM

TECHNICAL FIELD

The present invention relates to an information processing system, a content generation device, a content presentation device, a content generation method, a content presentation method and a program.

BACKGROUND ART

A virtual reality (VR) technology is a technology that provides a pseudo environment close to reality or an actual object. Use of the VR technology makes it possible to play a pseudo race game with a player at a remote location or perform pseudo sightseeing reproducing various scenic spots, for example. Therefore, the VR technology is being utilized in various fields such as entertainment or education.

Non-Patent Literature 1 describes a simulator which simulates surfing in a real world using virtual three-dimensional video images using a head-mounted display, sound, air by a fan and a movable simulated surfboard. Such a simulator can provide an environment where surfing can be easily experienced without going to the sea.

An object of many VR technologies is to provide an environment close to the real world, and information used for that is acquired by simulating the real world and utilized. In the case of pseudo surfing described above, information relating to wave movement is acquired by simulating an ideal wave shape for surfing. Then, by controlling video images to be displayed and the movement of a pseudo surfboard or the like based on the acquired information, a pseudo experience as if actually surfing can be provided for a user.

When providing the pseudo experience, it is not always necessary to use information based on reality in the VR technology. For example, in the case of considering a metaphorical expression of "waves of people" from a viewpoint of entertainment, it is possible to provide an experience of not "surfing the waves of the sea" but "surfing the waves of people" which is impossible in reality. In this case, for example, when people crossing an intersection are likened to "the waves of people", by using conventional technologies such as a Gaussian mixture model and a maximum likelihood method, a wave shape can be obtained from density of people (see Non-Patent Literature 2).

CITATION LIST

Non-Patent Literature

Non-Patent Literature 1: "VR Surfing Simulator Rental NYC-Nj-CT-Philly", [online], [Searched on Mar. 20, 2019], Internet<URL: http://nextgeneventco.com/vr-surfing-simulator-ny-nj-ct-pa/>

Non-Patent Literature 2: "Gaussian Mixture Model (GMM)- useful not only for clustering but also for obtaining probability density distribution of dataset-", [online], [Searched on Mar. 20, 2019], Internet<URL: https://datachemeng.com/gaussianmixturemodel/>

SUMMARY OF THE INVENTION

Technical Problem

As described above, by using the technology described in Non-Patent Literature 2, the wave shape can be obtained by using the density of people, that is, position information of objects (people). However, even though the wave shape (undulations) can be expressed, a wave expression cannot be expressed just by using the position information of the objects. The "wave expression" here means information indicating a characteristic of a presentation target (wave), which cannot be presented just by the shape of the presentation target, such as a "raging wave" accompanied by violent movement like rolling or a splash, a "calm" for which the wave repeats gentle undulations, or "emerald blue" seen in the southern sea.

An object of the present invention implemented in consideration of the problem described above is to provide an information processing system, a content generation device, a content presentation device, a content generation method, a content presentation method and a program capable of presenting more expressive content for a pseudo experience by expressing the information that cannot be expressed just by the shape of the presentation target obtained based on the position information.

Means for Solving the Problem

In order to solve the above-described problem, an information processing system according to the present invention is the information processing system including a content generation device configured to generate content information relating to presentation of content, and a content presentation device configured to control the presentation of the content, the content generation device includes a video image input unit configured to acquire an input video image, a video image detection unit configured to detect position information of an object from the input video image acquired by the video image input unit, an attribute extraction unit configured to extract attribute information of the object detected by the video image detection unit from the input video image acquired by the video image input unit, and an information generation unit configured to generate the content information corresponding to the position information detected by the video image detection unit and the attribute information extracted by the attribute extraction unit, and the content presentation device includes a presentation control unit configured to control the presentation of the content by a content presentation unit configured to present the content according to the content information generated by the information generation unit.

In addition, in order to solve the above-described problem, a content generation device according to the present invention is the content generation device that generates content information relating to presentation of content, and includes: a video image input unit configured to acquire an input video image, a video image detection unit configured to detect position information of an object from the input video image acquired by the video image input unit, an attribute extraction unit configured to extract attribute information of the object detected by the video image detection unit from the input video image acquired by the video image input unit, and an information generation unit configured to generate the content information corresponding to the position information detected by the video image detection unit and the attribute information extracted by the attribute extraction unit.

Further, in order to solve the above-described problem, a content presentation device according to the present invention is the content presentation device that controls presentation of content, and includes a presentation control unit configured to control the presentation of the content by a content presentation unit configured to present the content according to content information generated corresponding to position information of an object included in an input video image and attribute information of the object.

Also, in order to solve the above-described problem, a content generation method according to the present invention is the content generation method in a content generation device configured to generate content information relating to presentation of content, and includes: a step of acquiring an input video image; a step of detecting position information of an object from the acquired input video image; a step of extracting attribute information of the detected object from the acquired input video image; and a step of generating the content information corresponding to the detected position information and the extracted attribute information.

In addition, in order to solve the above-described problem, a content presentation method according to the present invention is the content presentation method in a content presentation device configured to control presentation of content, and includes a step of controlling the presentation of the content by a content presentation unit configured to present the content according to content information generated corresponding to position information of an object included in an input video image and attribute information of the object.

Further, in order to solve the above-described problem, a program according to the present invention makes a computer function as the content generation device described above.

Also, in order to solve the above-described problem, a program according to the present invention makes a computer function as the content presentation device described above.

Effects of the Invention

According to the information processing system, the content generation device, the content presentation device, the content generation method, the content presentation method and the program according to the present invention, by expressing information that cannot be expressed just by a shape of a presentation target obtained based on position information, more expressive content for a pseudo experience can be presented.

BRIEF DESCRIPTION OF DRAWINGS

FIG. 3 is a diagram illustrating an example of a detection result of position information of the objects by the video image detection unit illustrated in FIG. 1.

FIG. 4 is a diagram illustrating an example of an extraction result of attribute information by an attribute extraction unit illustrated in FIG. 1.

DESCRIPTION OF EMBODIMENTS

Hereinafter, an embodiment of the present invention will be described with reference to the drawings.

Figure 1:
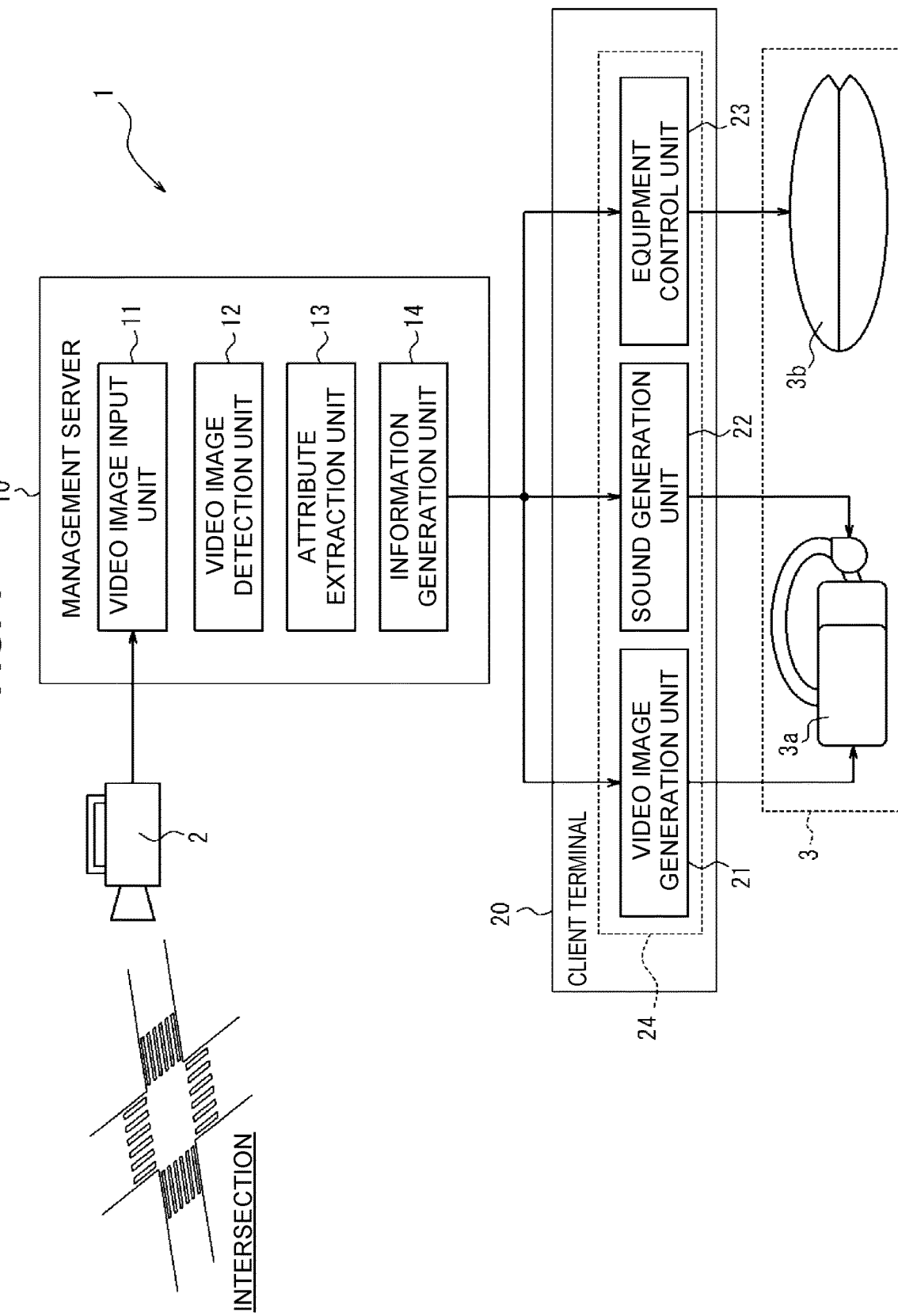
FIG. 1 is a diagram illustrating a configuration example of an information processing system according to an embodiment of the present invention.

FIG. 1 is a diagram illustrating a configuration example of an information processing system 1 according to one embodiment of the present invention. Hereinafter, the information processing system 1 according to the present embodiment will be described using an example of a system that provides a user with a pseudo experience of surfing. Note that the present invention is not limited to the example described above, and is applicable to various systems that provide a user with a pseudo experience using a VR technology.

The information processing system 1 illustrated in FIG. 1 is a server-client type system, and includes a management server 10 and a client terminal 20. The management server 10 and the client terminal 20 are communicable via a predetermined network. The management server 10 is an example of a content generation device. The client terminal 20 is an example of a content presentation device.

The management server 10 generates content information relating to presentation of content. The management server 10 acquires a video image photographed by a camera 2 that photographs an intersection, analyzes the acquired video image, and generates the content information according to an analysis result, for example.

The client terminal 20 acquires the content information generated by the management server 10, and controls the presentation of the content by a content presentation unit 3 that presents the content according to the acquired content information. The content presentation unit 3 includes a head-mounted display 3a mounted on a head of a user and a movable pseudo surfboard 3b or the like for example, but not limited thereto. The content information is the information indicating a video image to be displayed on the head-mounted display 3a and sound to be outputted on the head-mounted display 3a. In addition, the content information is the information indicating movement of the pseudo surfboard. The client terminal 20 controls the video image and the sound to be viewed by the user on the head-mounted display 3a based on the content information. In addition, the client terminal 20 controls the movement of the pseudo surfboard 3b based on the content information.

Next, configurations of the management server 10 and the client terminal 20 will be described with reference to FIG. 1. First, the configuration of the management server 10 will be described.

The management server 10 illustrated in FIG. 1 includes a video image input unit 11, a video image detection unit 12, an attribute extraction unit 13, and an information generation unit 14. Respective functions of the video image input unit 11, the video image detection unit 12, the attribute extraction unit 13 and the information generation unit 14 can be achieved by executing a program stored in a memory provided in the management server 10 by a processor or the like, for example. In the present embodiment, the "memory" is, for example, a semiconductor memory, a magnetic memory or an optical memory, but is not limited thereto. In addition, in the present embodiment, the "processor" is a general purpose processor or a processor specialized in specific processing or the like, but is not limited thereto.

The video image input unit 11 acquires the video image photographed by the camera 2 that photographs an intersection. The video image input unit 11 acquires the video image photographed by the camera 2 in real time, for example.

Figure 2:
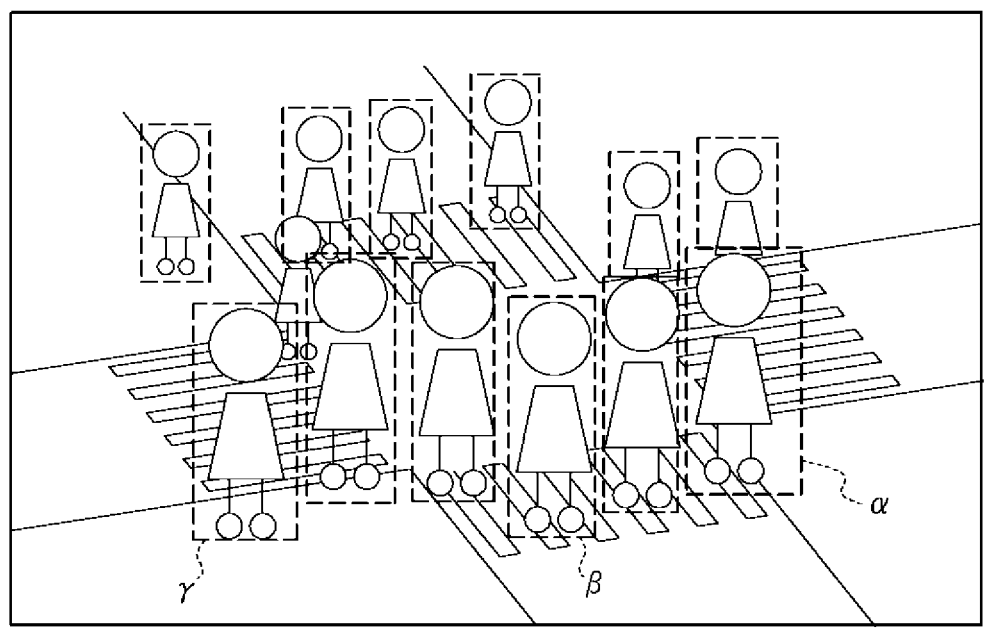
FIG. 2 is a diagram schematically illustrating a detection result of objects by a video image detection unit illustrated in FIG. 1.

The video image detection unit 12 detects position information of predetermined objects (people, in the present embodiment) from the video image (input video image) acquired by the video image input unit 11. Specifically, the video image detection unit 12 detects areas where the objects are present in the input video image. For detection of the objects in the input video image, an existing technology such as a template matching technology or a technology using machine learning can be used. The video image detection unit 12 detects areas a, 0, y . . . where the objects are present as rectangular areas for each of the objects (people, in FIG. 2) included in the input video image, as illustrated in FIG. 2, for example.

The video image detection unit 12 acquires the position information for each detected area. For example, the video image detection unit 12 detects a coordinate (x, y) and a size (w, h) on a screen of the input video image, for each detected area as illustrated in FIG. 3. In addition, the video image detection unit 12 may detect a coordinate (z) in a depth direction for each detected area, based on a positional relationship between a position of the camera 2 and a photographing location.

The attribute extraction unit 13 extracts attribute information of the objects detected by the video image detection unit 12, from the input video image acquired by the video image input unit 11. The attribute extraction unit 13 extracts additional information extractable from features of an image in the input video image, such as gender, an age group, a race, a height, clothes and a motion vector, as the attribute information of the objects. In a case where a resolution of the input video image is high enough to identify an individual person and a database in which names and addresses of individuals are recorded is prepared, the attribute extraction unit 13 may extract the information of the names and addresses or the like of the objects (people) from the database as the attribute information. For extraction of the attribute information, an existing technology can be used.

The attribute extraction unit 13 extracts the attribute information of the object present in the area for each area detected by the video image detection unit 12, as illustrated in FIG. 4. FIG. 4 illustrates an example of extracting the information relating to gender (G), an age group(Y), a height (T), clothes (C) and a motion vector (V), as the attribute information.

The information generation unit 14 generates the content information corresponding to the position information detected by the video image detection unit 12 and the attribute information extracted by the attribute extraction unit 13, and performs transmission to the client terminal 20. Details of generation of the content information by the information generation unit 14 will be described later.

Next, the configuration of the client terminal 20 will be described.

The client terminal 20 illustrated in FIG. 1 includes a video image generation unit 21, a sound generation unit 22, and an equipment control unit 23. The video image generation unit 21, the sound generation unit 22 and the equipment control unit 23 configure a presentation control unit 24. For example, the respective functions of the video image generation unit 21, the sound generation unit 22 and the equipment control unit 23 can be achieved by executing the program stored in a memory provided in the client terminal 20 by a processor or the like.

The video image generation unit 21 acquires the content information transmitted from the management server 10, generates a video image according to the acquired content information, and makes the head-mounted display 3a display the generated video image.

The sound generation unit 22 acquires the content information transmitted from the management server 10, generates sound according to the acquired content information, and makes the head-mounted display 3a output the generated sound.

The equipment control unit 23 acquires the content information transmitted from the management server 10, and controls the movement of the pseudo surfboard 3b according to the acquired content information.

As described above, the video image generation unit 21, the sound generation unit 22 and the equipment control unit 23 configure the presentation control unit 24. Thus, the presentation control unit 24 controls the presentation of the content by the content presentation unit 3 according to the content information generated by the information generation unit 14.

Next, generation of the content information by the information generation unit 14 will be described. Hereinafter, description is given using an example that the information generation unit 14 generates the content information that expresses "a wave of people" which is a presentation target.

The information generation unit 14 generates a wave shape based on the position information of each area where the object is present, which is detected by the video image detection unit 12. In order to generate the wave shape, the information generation unit 14 obtains a probability density function p(x|π, μ, M) shown in Expression (1) using a Gaussian mixture model and a maximum likelihood method, for example.

[Math. 1]

$$p(x|\pi, \mu, M) = \sum\nolimits^{K} \pi_K N(x|\mu_K, M_K) \qquad \text{Expression (1)}$$

In Expression (1), x is the position information of each area, π is a mixing coefficient, μ is a mean vector, M is a covariance matrix, N is a normal distribution, and K is a cluster number. The cluster number K is handled as being known. Therefore, the cluster number K is a fixed number or a predefined constant which fluctuates according to a total number of the detected areas (for example, 2 when the number of the areas is smaller than 10, 3 when the number of the areas is smaller than 25, and 4 when the number of the areas is 25 or larger). The probability density function p is expressed as an overlap of K pieces of the normal distributions. The probability density function p is a function which determines the wave shape. Hereinafter, the probability density function p is called a shape function p.

Various methods can be used to generate the content information according to the attribute information.

In the case of using the gender as the attribute information for example, the information generation unit 14 uses an indicator function g which returns 1 in the case where the total number of males exceeds the total number of females, and 0.5 in the opposite case. According to the indicator function g, a gentle wave with soft undulations is generated in the case where there are more females. The indicator function g is the function which determines a characteristic (expression) which cannot be expressed just by the wave shape, namely, wave calmness. Hereinafter, the indicator function g is called an expression function g.

In addition, in the case of using the age group as the attribute information, for example, the information generation unit 14 replaces the age group with a coefficient for the shape. The information generation unit 14 uses the coefficient according to the age group and a smoothing function s, for example. Specifically, the information generation unit 14 allocates a coefficient a={1.2, 2.0, 1.5, 1.0} to the age groups (the age of 0-20, the age of 20-40, the age of 40-60, and the age over 60). Since the position information (FIG. 3) and the age group (FIG. 4) are obtained for each area detected by the video image detection unit 12, the information generation unit 14 defines, while shifting a two-dimensional window having a fixed area on a coordinate axis, a function $s_a$ which obtains a coefficient average "a" within the window. According to the function $s_a$, a rolling wave with a conspicuous difference of elevation is generated as an age configuration becomes diversified. The function $s_a$ is the function which determines the characteristic (expression) which cannot be expressed just by the wave shape, namely, wave rolling. Hereinafter, the function $s_a$ is called an expression function $s_a$.

In addition, in the case of using the height as the attribute information, for example, the information generation unit 14 defines a function $s_t$ similar to the expression function $s_a$ for an absolute value of the height extracted for each area detected by the video image detection unit 12. According to the function $s_t$, a higher wave is generated when there are more tall people. The function $s_t$ is the function which determines the characteristic (expression) which cannot be expressed just by the wave shape, namely, wave height. Hereinafter, the function $s_t$ is called an expression function $s_t$.

Further, in the case of using the clothes as the attribute information, for example, the information generation unit 14 defines a smoothing function $s_c$ which obtains a color average within a fixed range. According to the smoothing function $s_c$, a spectacular water surface is generated in a warm season and a calm water surface is generated in a cold season.

Also, in the case of using the motion vector as the attribute information, for example, the information generation unit 14 defines a smoothing function $s_v$ which obtains a vector length average within the window. According to the smoothing function $s_v$, wave power can be expressed, and utilization in a performance of a wave splash or the like is possible, for example.

The information generation unit 14 uses the shape function p and the expression functions g, $s_a$, $s_t$, determines a final wave w based on Expression (2) below, and performs transmission to the client terminal 20 as the content information.

$$w = pgs_a s_t \quad \text{Expression (2)}$$

In addition, the information generation unit 14 transmits the smoothing function $s_c$ and the smoothing function $s_v$ to the client terminal 20 as the content information. The smoothing function $s_c$ can be used as a texture when generating a three-dimensional video image. Further, the smoothing function $s_v$ can be used in the performance of the wave splash, wave sound and a wind or the like.

Next, operations of the management server 10 and the client terminal 20 will be described.

Figure 5:
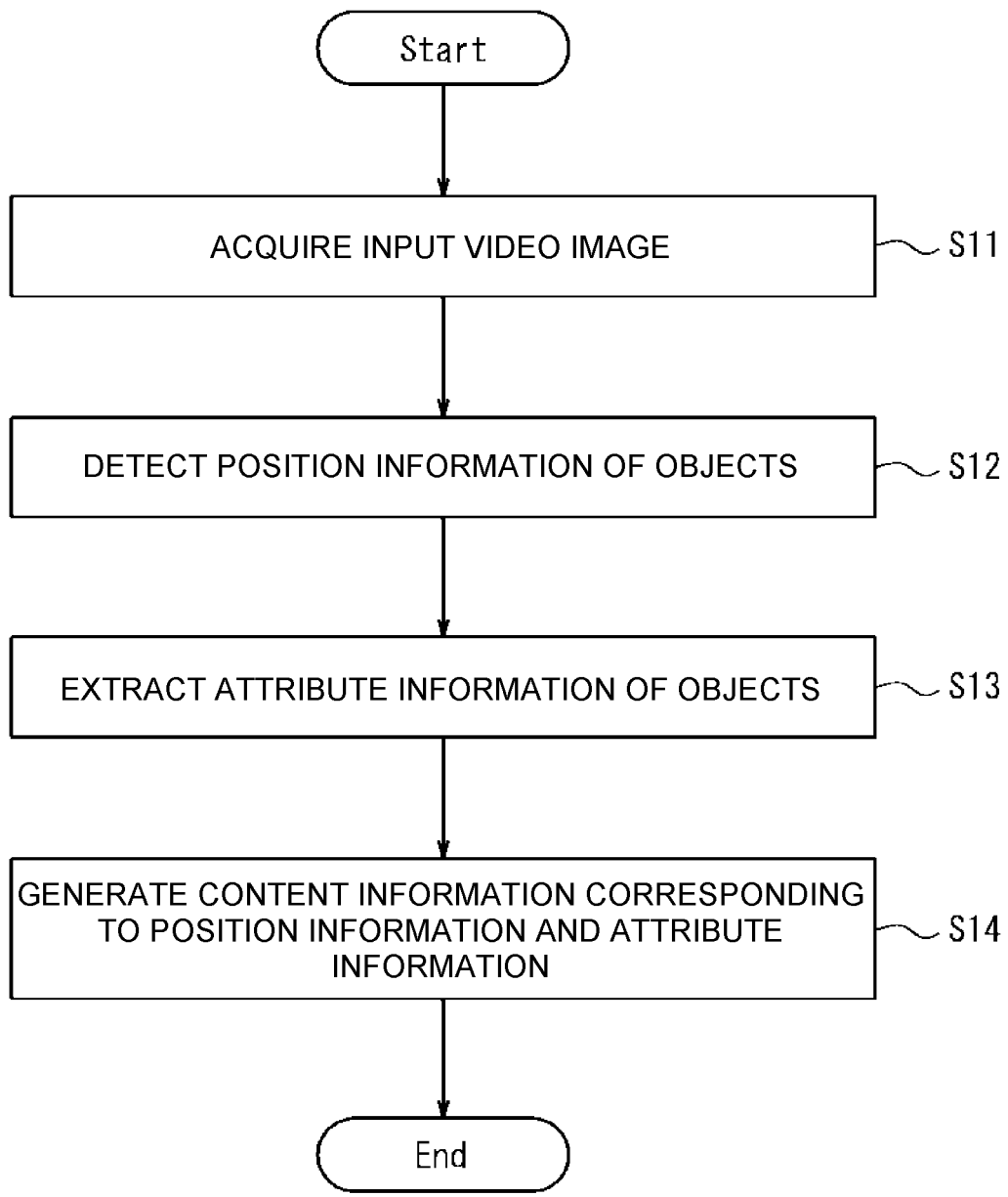
FIG. 5 is a flowchart illustrating an example of an operation of a management server illustrated in FIG. 1.

FIG. 5 is a flowchart illustrating the operation of the management server 10, and is the drawing for explaining a content generation method in the management server 10.

The video image input unit 11 acquires the input video image photographed by the camera 2 (step S11).

The video image detection unit 12 detects the position information of the objects from the input video image acquired by the video image input unit 11 (step S12).

The attribute extraction unit 13 extracts the attribute information of the objects detected by the video image detection unit 12 from the input video image acquired by the video image input unit 11 (step S13).

The information generation unit 14 generates the content information corresponding to the position information detected by the video image detection unit 12 and the attribute information extracted by the attribute extraction unit 13 (step S14).

Figure 6:
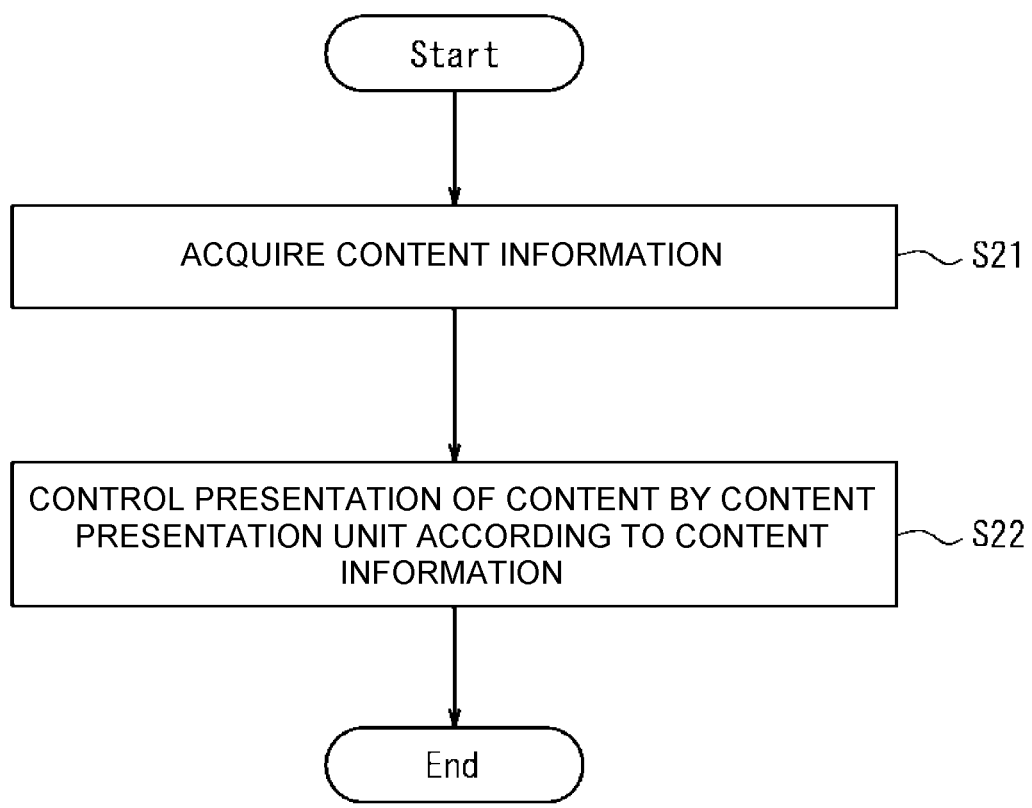
FIG. 6 is a flowchart illustrating an example of an operation of a client terminal illustrated in FIG. 1.

FIG. 6 is a flowchart illustrating the operation of the client terminal 20, and is the drawing for explaining a content presentation method in the client terminal 20.

The presentation control unit 24 acquires the content information generated by the management server 10 (step S21). That is, the video image generation unit 21, the sound generation unit 22 and the equipment control unit 23 acquire the content information respectively.

Next, the presentation control unit 24 controls the presentation of the content by the content presentation unit 3 according to the acquired content information (step S22). Specifically, the video image generation unit 21 generates the video image according to the content information, and makes the head-mounted display 3a display the video image. In addition, the sound generation unit 22 generates the sound according to the content information, and makes the head-mounted display 3a output the sound. Further, the equipment control unit 23 controls the movement of the pseudo surfboard 3b according to the content information.

In this way, in the present embodiment, the management server 10 includes the video image input unit 11, the video image detection unit 12, the attribute extraction unit 13, and the information generation unit 14. The video image input unit 11 acquires the input video image. The video image detection unit 12 detects the position information of the objects from the input video image. The attribute extraction unit 13 extracts the attribute information of the objects from the input video image. The information generation unit 14 generates the content information corresponding to the position information detected by the video image detection unit 12 and the attribute information extracted by the attribute extraction unit 13. Further, the client terminal 20 includes the presentation control unit 24 that controls the presentation of the content by the content presentation unit 3 according to the content information generated by the information generation unit 14.

The information processing system 1 according to one embodiment of the present invention can express the information indicating the characteristic of the presentation target, which cannot be expressed by a shape expression based only on the position information of the objects, by using the attribute information of the objects so that more expressive content for the pseudo experience can be presented.

While the management server 10 (content generation device) and the client terminal 20 (content presentation device) are described above, a computer can be used to function as the management server 10 (content generation device) and the client terminal 20 (content presentation device). For such a computer, by storing the program describing processing content which achieves the respective functions of the management server 10 (content generation device) and the client terminal 20 (content presentation device) in a storage unit of the computer and reading and executing the program by a CPU of the computer, the computer can be operated as the management server 10 (content generation device) and the client terminal 20 (content presentation device).

Further, the program may be recorded in a computer-readable recording medium. When such a recording medium is used, the program can be installed to the computer. Here, the recording medium in which the program is recorded may be a non-transient recording medium. The non-transient recording medium is not limited in particular, and may be the recording medium such as a CD-ROM or a DVD-ROM, for example.

The above-described embodiment is explained as a representative example, and it is obvious to those skilled in the art that many changes and substitutions are possible within the meaning and scope of the present invention. Therefore, it is not to be understood that the present invention is limited by the above-described embodiment, and various modifications and changes are possible without departing from the scope of claims. For example, it is possible to combine a plurality of configuration blocks described in a configuration diagram of the embodiment into one, or divide one configuration block.

REFERENCE SIGNS LIST

1 Information processing system
10 Management server (content generation device)
11 Video image input unit
12 Video image detection unit
13 Attribute extraction unit
14 Information generation unit
20 Client terminal (content presentation device)
21 Video image generation unit
22 Sound generation unit
23 Equipment control unit
24 Presentation control unit

The invention claimed is:

1. An information processing system comprising a content generation device configured to generate content information relating to presentation of content, and a content presentation device configured to control presentation of the content,
wherein
the content generation device includes at least one processor configured to
acquire an input video image,
detect position information of an object from the input video image,
extract attribute information of the object detected from the input video image acquired, and
generate the content information corresponding to the position information detected and the attribute information extracted, the content information including information to display a wave based on the object detected, and
the content presentation device includes at least one processor configured to
control the presentation of the content according to the content information generated,
wherein
the object detected includes a plurality of people,
the attribute information includes gender, age, height, clothes, and motion of the plurality of people,
a level of undulation of the wave depends upon the gender of the plurality of people,
the level of undulation is softer when the gender indicates more female people in the plurality of people than male people than when the gender indicate more male people in the plurality of people than female people,
a shape of the wave is based on a probability density function generated based on a Gaussian mixture model,
the probability density function is given by:

$$p(x=\pi,\mu,M)=\Sigma^k \pi_k N(x=\mu_k,M_k)$$

where $\pi$ is a mixing coefficient, $\mu$ is a mean vector, M is a covariance matrix, N is a normal distribution, and K is a cluster number,
K is based on a total number of areas of the input video image in which the object is detected, and
the wave is generated based on the probability density function, a smoothing function based on the age, a smoothing function based on the height, and the level of undulation.

2. The information processing system according to claim 1, wherein the at least one processor of the content generation device is further configured to generate a sound corresponding to the wave.

3. The information processing system according to claim 2, further comprising a pseudo surfboard and a head mount display, wherein the at least one processor of the content presentation device is further configured to cause the head mount display to display the content and to control the movement of the pseudo surfboard based on the content.

4. The information processing system according to claim 3, wherein the acquired video image is captured by a camera disposed to capture video images of an intersection.

5. An information processing method for controlling a content generation device that generates content information relating to presentation of content, and a content presentation device that controls presentation of the content, the method comprising:
acquiring, by the content generation device, an input video image;
detecting, by the content generation device, position information of an object from the input video image;
extracting, by the content generation device, attribute information of the object detected from the input video image acquired;
generating, by the content generation device, the content information corresponding to the position information detected and the attribute information extracted, the content information including information to display a wave based on the object detected; and
controlling, by the content presentation device, the presentation of the content according to the content information generated,
wherein
the object detected includes a plurality of people,
the attribute information includes gender, age, height, clothes, and motion of the plurality of people,
a level of undulation of the wave depends upon the gender of the plurality of people,
the level of undulation is softer when the gender indicates more female people in the plurality of people than male people than when the gender indicate more male people in the plurality of people than female people, a shape of the wave is based on a probability density function generated based on a Gaussian mixture model, the probability density function is given by:

$$p(x=\pi,\mu,M)=\Sigma^k \pi_k N(x=\mu_k,M_k)$$

where $\pi$ is a mixing coefficient, $\mu$ is a mean vector, M is a covariance matrix, N is a normal distribution, and K is a cluster number, K is based on a total number of areas of the input video image in which the object is detected, and the wave is generated based on the probability density function, a smoothing function based on the age, a smoothing function based on the height, and the level of undulation.

6. A non-transitory computer-readable medium encoded with computer-readable instructions that, when executed by at least one processor, cause the at least one processor to perform a method comprising:

acquiring, by the content generation device, an input video image;

detecting, by the content generation device, position information of an object from the input video image;

extracting, by the content generation device, attribute information of the object detected from the input video image acquired;

generating, by the content generation device, the content information corresponding to the position information detected and the attribute information extracted, the content information including information to display a wave based on the object detected; and controlling, by the content presentation device, the presentation of the content according to the content information generated, wherein the object detected includes a plurality of people, the attribute information includes gender, age, height, clothes, and motion of the plurality of people, a level of undulation of the wave depends upon the gender of the plurality of people, the level of undulation is softer when the gender indicates more female people in the plurality of people than male people than when the gender indicate more male people in the plurality of people than female people, a shape of the wave is based on a probability density function generated based on a Gaussian mixture model, the probability density function is given by:

$$p(x=\pi,\mu,M)=\Sigma^k \pi_k N(x=\mu_k,M_k)$$

where $\pi$ is a mixing coefficient, $\mu$ is a mean vector, M is a covariance matrix, N is a normal distribution, and K is a cluster number, K is based on a total number of areas of the input video image in which the object is detected, and the wave is generated based on the probability density function, a smoothing function based on the age, a smoothing function based on the height, and the level of undulation.

\* \* \* \* \*